(12) United States Patent
Costache et al.

(10) Patent No.: US 10,275,648 B2
(45) Date of Patent: Apr. 30, 2019

(54) IMAGE PROCESSING METHOD AND SYSTEM FOR IRIS RECOGNITION

(71) Applicant: FotoNation Limited, Galway (IE)

(72) Inventors: Gabriel Costache, Galway (IE); Barry McCullagh, Galway (IE); Serghei Carateev, Galway (IE)

(73) Assignee: FotoNation Limited, Galway (IE)

( * ) Notice: Subject to any disclaimer, the term of this patent is extended or adjusted under 35 U.S.C. 154(b) by 68 days.

(21) Appl. No.: 15/427,904

(22) Filed: Feb. 8, 2017

(65) Prior Publication Data
US 2018/0225510 A1   Aug. 9, 2018

(51) Int. Cl.
*G06K 9/00* (2006.01)
*G06T 7/11* (2017.01)

(52) U.S. Cl.
CPC ....... *G06K 9/00604* (2013.01); *G06K 9/0061* (2013.01); *G06K 9/00228* (2013.01); *G06T 7/11* (2017.01); *G06T 2207/10004* (2013.01); *G06T 2207/30201* (2013.01)

(58) Field of Classification Search
USPC ....... 348/207.1; 382/103, 115, 117, 118, 167
See application file for complete search history.

(56) References Cited

U.S. PATENT DOCUMENTS

| | | | | |
|---|---|---|---|---|
| 7,953,251 B1* | 5/2011 | Steinberg | ............. | G06K 9/0061 382/103 |
| 8,064,647 B2* | 11/2011 | Bazakos | ............ | G06K 9/00261 382/117 |
| 8,098,901 B2* | 1/2012 | Hamza | ................. | G06K 9/0061 382/117 |
| 8,170,293 B2* | 5/2012 | Tosa | ................... | G06K 9/00604 382/115 |

(Continued)

FOREIGN PATENT DOCUMENTS

| WO | 2008/018887 A1 | 2/2008 |
|---|---|---|
| WO | 2008/050107 A1 | 5/2008 |

(Continued)

OTHER PUBLICATIONS

A. K. Jain, A. Ross, and S. Prabhakar, "An Introduction to Biometric Recognition," IEEE Transactions on Circuits and Sysems for Video Technology, vol. 14, No. 1, Jan. 2004, pp. 4-20.

(Continued)

*Primary Examiner* — Xuemei G Chen

(57) ABSTRACT

A method of iris recognition comprises detecting a body region larger than and comprising at least one iris in an image and performing a first eye modelling on the detected body region. If successful, the result of first iris segmentation based on the first eye model is chosen. Otherwise, a first iris identification is performed on the detected body region. If successful, the result of second iris segmentation based on a second eye modelling is chosen. Otherwise, second iris (Continued)

identification is performed on the image, third eye modelling is performed on the result of the second iris identification, and third iris segmentation is performed on the result of the third eye modelling. If successful, the result of third iris segmentation based on a third eye modelling is chosen. An iris code is extracted from any selected iris segment of the image.

12 Claims, 3 Drawing Sheets

(56) References Cited

U.S. PATENT DOCUMENTS

| | | | | |
|---|---|---|---|---|
| 8,630,464 | B2* | 1/2014 | Whillock | G06K 9/0061 |
| | | | | 382/117 |
| 8,644,565 | B2* | 2/2014 | Du | G06K 9/00604 |
| | | | | 382/103 |
| 8,649,604 | B2* | 2/2014 | Steinberg | G06K 9/00228 |
| | | | | 382/118 |
| 8,845,625 | B2* | 9/2014 | Angeley | G06T 7/149 |
| | | | | 606/6 |
| 9,002,073 | B2* | 4/2015 | Hanna | A61B 3/14 |
| | | | | 382/117 |
| 9,239,957 | B2* | 1/2016 | Raducan | G06F 17/30244 |
| 9,355,315 | B2* | 5/2016 | Vugdelija | G06K 9/6218 |
| 9,767,358 | B2* | 9/2017 | Xue | G06K 9/0061 |
| 2003/0007687 | A1* | 1/2003 | Nesterov | G06K 9/0061 |
| | | | | 382/167 |
| 2006/0147094 | A1* | 7/2006 | Yoo | G06K 9/00604 |
| | | | | 382/117 |
| 2009/0252382 | A1* | 10/2009 | Liu | G06K 9/0061 |
| | | | | 382/117 |
| 2011/0069182 | A1* | 3/2011 | Nanu | G06K 9/0061 |
| | | | | 348/207.1 |
| 2016/0092720 | A1* | 3/2016 | Lee | G06K 9/00604 |
| | | | | 348/78 |
| 2017/0186138 | A1* | 6/2017 | Raducan | G06F 17/30244 |

FOREIGN PATENT DOCUMENTS

| | | |
|---|---|---|
| WO | 2011/124512 A2 | 10/2011 |
| WO | 2015/150292 A1 | 10/2015 |
| WO | 2017/054941 A1 | 4/2017 |
| WO | 2017/129325 A1 | 8/2017 |

OTHER PUBLICATIONS

D. Cristinacce, and T.F. Cootes, "A Comparison of Shape Constrained Facial Feature Detectors", Proc. Int. Conf on Face and Gesture Recognition, 2004, p. 1-6.

Xiong, X. and De La Torre, F."Supervised Descent Method and Its Applications to Face Alignment", IEEE Conference on Computer Vision and Pattern Recognition (CVPR), 2013, pp. 1-8.

* cited by examiner

IMAGE PROCESSING METHOD AND SYSTEM FOR IRIS RECOGNITION

FIELD

The present invention relates to an image processing method and system for iris recognition.

BACKGROUND

The iris surrounds the dark, inner pupil region of an eye and extends concentrically to the white sclera of the eye.

A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric.

For the purposes of iris based recognition, an image of a subject comprising an iris region is acquired with an imaging system, typically using infra-red (IR) illumination to bring out the main features of an underlying iris pattern.

Then, eye and/or iris detection is applied over the whole acquired image to identify a region of the image containing the iris pattern. Iris segmentation is performed on the detected region of the image in order to define an iris segment, and then feature extraction is performed on the iris segment. The extracted features can be used to generate an iris code for the subject of the acquired image and this can be used in conjunction with stored iris code(s) to identify, recognise or authenticate the subject of the image.

If there are certain requirements for the input image regarding the iris size and location, as in the case of BS ISO/IEC 19794-6:2005 compliant images, this can speed up the detection process.

Without such requirements, there can be a large variation in iris size and location within acquired images. For example, in the context of handheld devices, for example, smartphones, the range of distances between the eye and the device can vary from less than 15 cm out to 40 cm or more, depending on how close a user holds the device or the length of the user's arm—this can affect the size, location and quality of the iris region appearing in an acquired image.

Thus, the detection process can be slow and possibly lead to false candidates, since the initial processing step has to detect where the iris is located within the whole acquired image and determine the size of the iris.

As indicated, in an attempt to speed up processing, some systems perform relatively large-scale and so faster, eye detection before performing refined iris detection on the result of the eye detection. However, this can result in non-segmented or wrongly segmented iris images, especially in cases where the image is so closely acquired that only a portion of the eye is included therein. In these cases, since the full eye is not within the image, the eye detection can fail to correctly locate the eye, thus providing a poor quality or wrong result for the following image processing.

SUMMARY

According to a first aspect of the present invention there is provided a method of iris recognition according to claim 1. There are also provided an image processing system and a computer program product according to claims 13 and 14.

The method combines eye detection, eye modelling, iris detection and iris segmentation to provide iris recognition which is fast and reliable, even working on input images presenting a high range of variation in iris size and location.

BRIEF DESCRIPTION OF THE DRAWINGS

Embodiments of the invention will now be described, by way of example, with reference to the accompanying drawings, in which.

DETAILED DESCRIPTION

Figure 1:
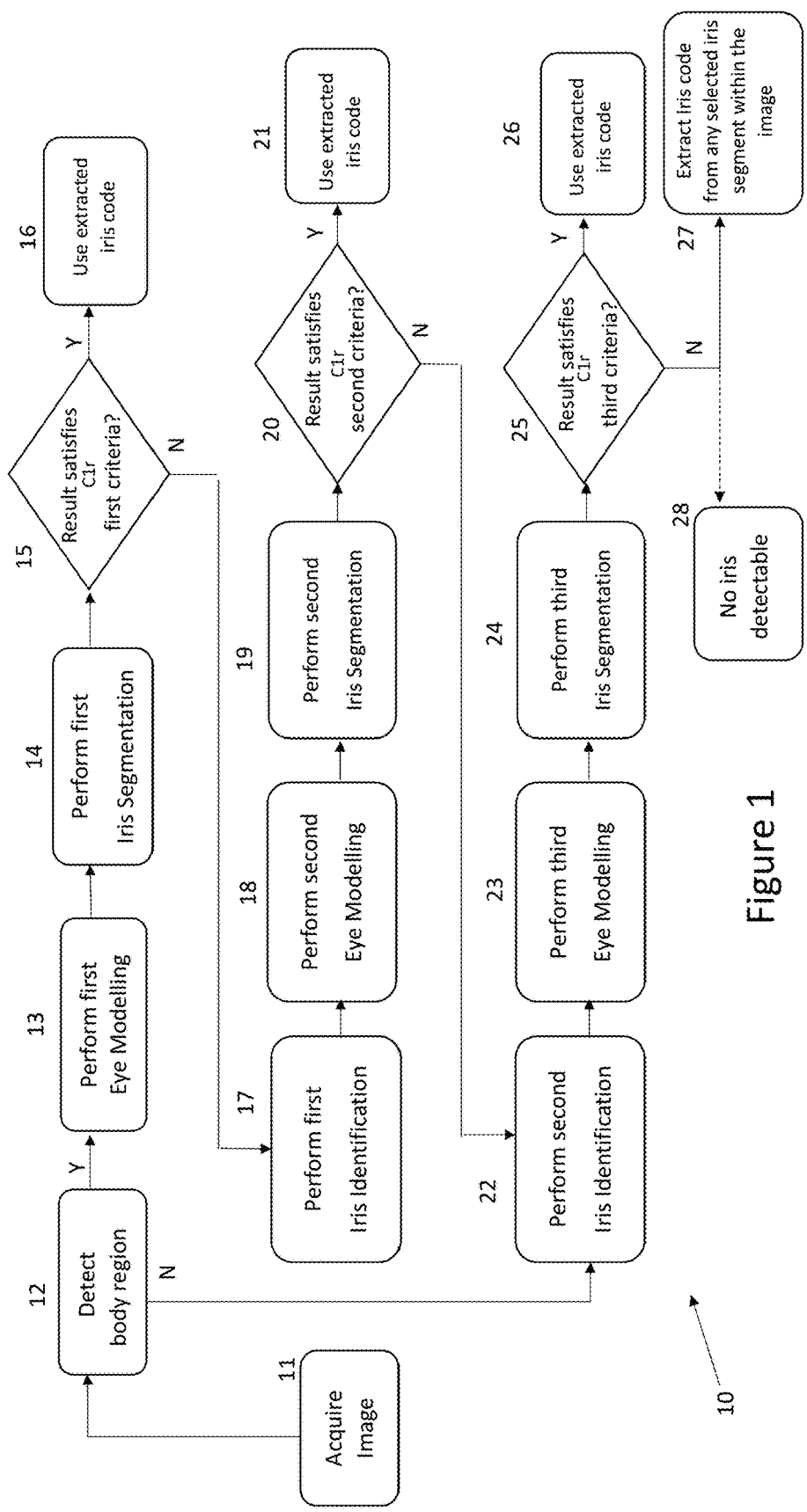
FIG. 1 illustrates a method according to an embodiment of the present invention.

Referring now to FIG. 1 there is shown a method 10 for performing iris recognition according to an exemplary embodiment of the present invention.

The method 10 comprises an initial step 11 of acquiring an image, followed by attempting to detect a body region larger than and comprising at least one iris within the acquired image, step 12.

Figure 2:
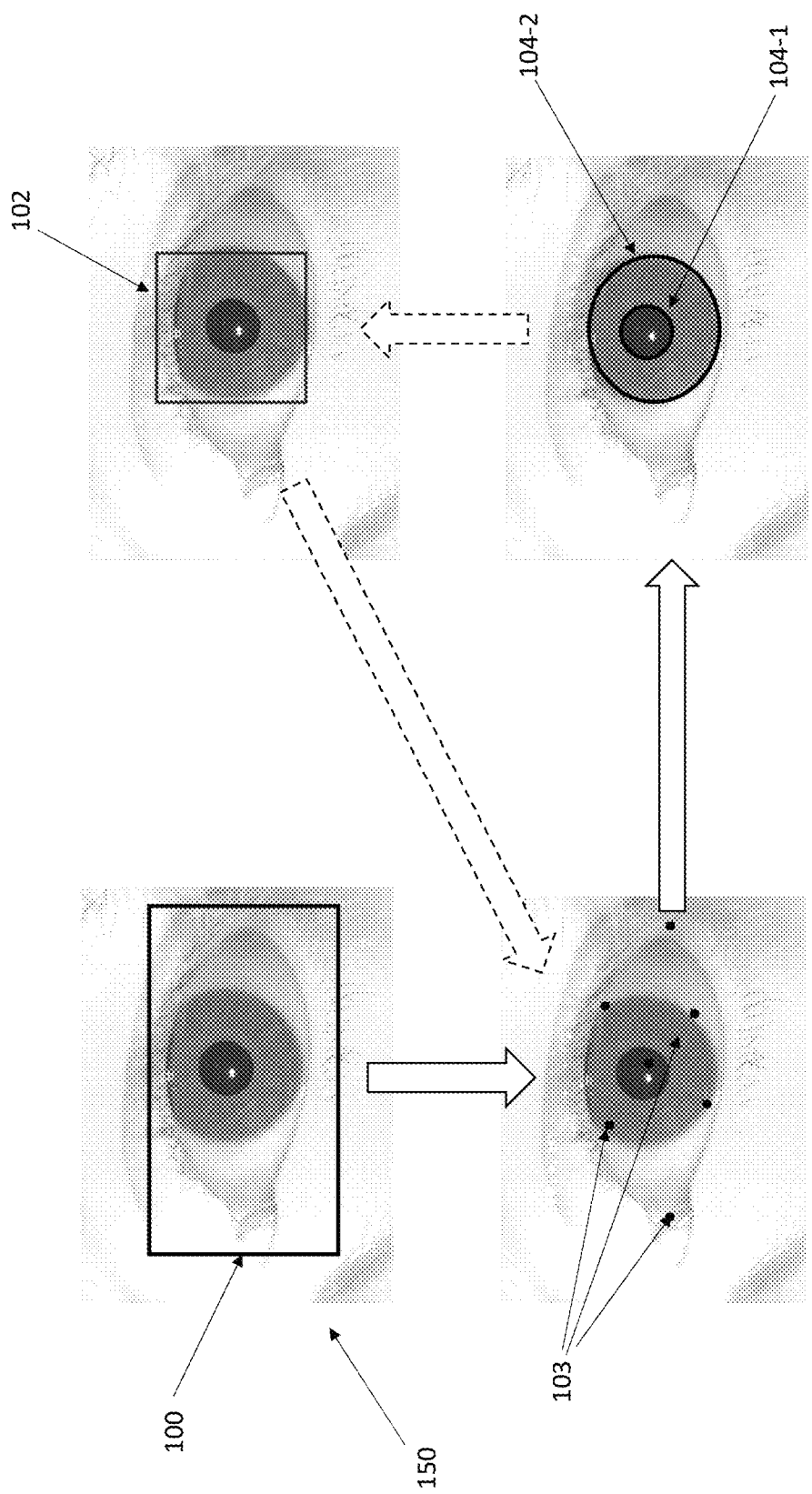
FIG. 2 illustrates an image processing sequence of the method illustrated in FIG. 1, comprising: eye detection within an acquired image, eye modelling, iris segmentation and iris detection within a detected eye region.
Figure 3:
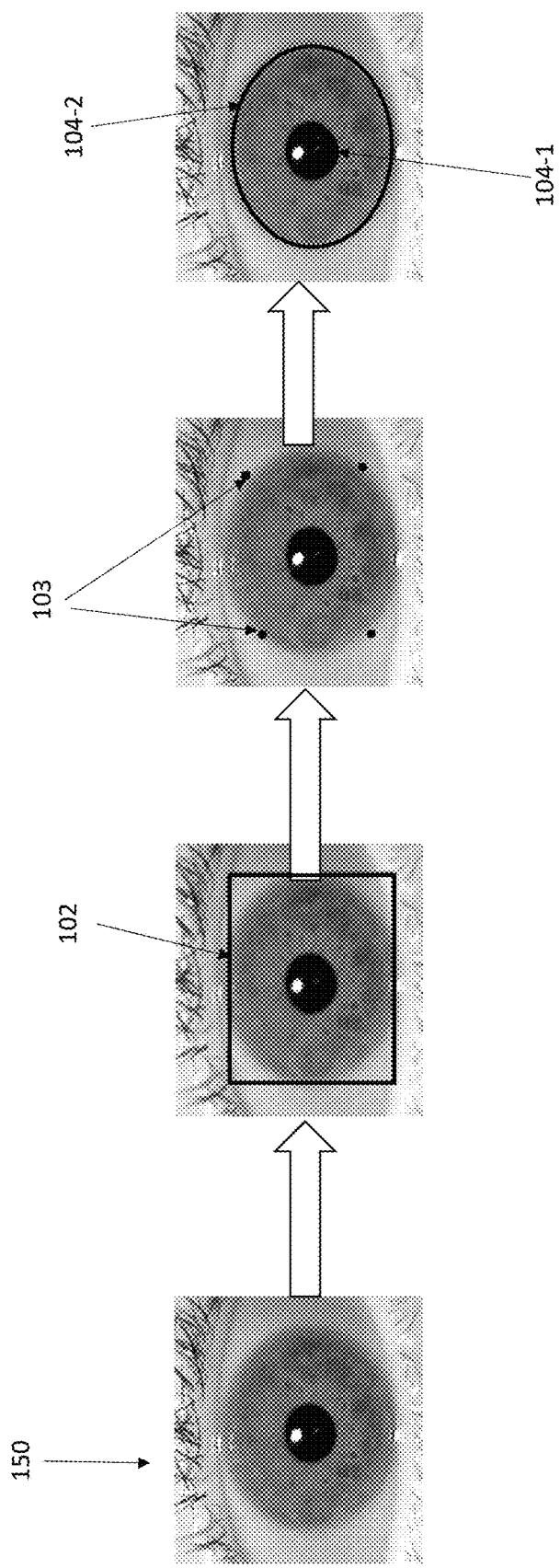
FIG. 3 illustrates another image processing sequence of the method illustrated in FIG. 1, comprising: an acquired image, iris identification within the acquired image, eye modelling and iris segmentation.

In the FIGS. 2 and 3, the exemplary acquired images 150 extend to include an eye region and only an iris region respectively.

Note, however, that this method makes few assumptions about the subject being imaged and as will be appreciated from the discussion below, while the image acquired might have a field of view large enough to acquire an image of an iris and/or an eye or face or body region surrounding the iris, the image may also be so closely captured as to only extend across an iris region.

The only limitation on the usable field of view is that any iris imaged within the field of view needs to be large enough (in terms of pixel area) to facilitate extraction of an iris code suitable for identifying, recognizing or authenticating a subject. As discussed in PCT Application Nos. WO2015/150292 (Reference: FN-395-PCT), the disclosure of which is incorporated herein by reference such it is generally considered that an imaged iris would need to extend across more than 120 horizontal pixels in order to be used for biometric authentication, although it is possible to use imaged irises extending across as few as 50-100 pixels for authentication.

The detection at step 12 can be any type of detection suitable for detecting image features larger than and comprising one or more iris regions.

For example, the detection at step 12 can be an eye detection resulting in one or more detected eye regions within a face, as in the exemplary eye region 100 illustrated in FIG. 2.

There are a number of approaches to detecting an eye region within an image and these can be based on traditional type classifiers such as Haar classifiers, active appearance models (AAM) or more recently classifiers such as random tree classifiers (RTC) or neural network type classifiers.

The detection at step 12 can also be for example a face detection, or it can comprise face detection followed by eye detection.

Face detection in real-time has become a standard feature of most digital imaging devices and there are many techniques for identifying such regions within an acquired image, for example, as disclosed in WO2008/018887 (Reference: FN-143), the disclosure of which is incorporated herein by reference. Again, recently, it has become more common to implement face detection or indeed body detection based on neural network type classifiers as disclosed in PCT Application Nos. PCT/EP2016/063446 (Reference: FN-471-PCT) and PCT/EP2016/081776 (Reference: FN-481-PCT), the disclosures of which are incorporated herein by reference.

In any case, in response to a detection of the body region at step 12, the method proceeds by performing a first eye modelling on the detected body region, step 13.

Eye modelling determines a number of cardinal points 103, FIG. 2, around the eye within a region of an image. A number of possible techniques can be used to determine the location of a set of cardinal points in an image or a region of an image. For example, Constrained Local Models (CLM) such as discussed in "A comparison of shape constrained facial feature detectors", D. Cristinacce and T. F. Cootes, Proc. Int. Conf on Face and Gesture Recognition, 2004, pp. 375-380, involves any method in which a set of local models are used to generate response images, with a shape model then being used to search for the best combined response. Other techniques include Supervised Descent Method (SDM) as disclosed in "Supervised Descent Method and Its Applications to Face Alignment", Xiong et al, IEEE Conference on Computer Vision and Pattern Recognition (CVPR), 2013.

A first iris segmentation is then performed, step 14, based on the cardinal points resulting from first eye modelling step 13. Iris segmentation results in a segmented iris which is ideally precisely located within the region 100 detected at step 12. In the embodiment, the segmented iris is defined by an inner perimeter 104-1 and an outer perimeter 104-4.

Details of how the iris segment located between the inner 104-1 and outer perimeter 104-2 is used to extract an iris code and how such codes are employed, for example, in a biometric authentication unit (BAU) to recognize and/or authenticate a user can be found in PCT Application Nos. WO2015/150292 (Reference: FN-395-PCT), WO2011/124512 (Reference: FN-458-EP) and WO2008/050107 (Reference: FN-457-EP), the disclosures of which are incorporated herein by reference.

In step 15, the method continues by determining whether a confidence level associated with the segmented iris is above a predetermined first threshold. This confidence level can be determined either based on the iris segment itself or it can be based on iris code extracted from the iris segment.

It is known for iris code extractors, such as the BAU described in WO2015/150292 (Reference: FN-395-PCT) to associate a confidence level with an extracted iris code indicating the quality of iris code. Some factors which can affect this confidence level include whether or not the subject may have been blinking or partially blinking when the image is acquired and so, if only a limited portion of the iris was visible or well illuminated when an image was acquired, a lower confidence level for the extracted iris code is more likely. Other factors which can influence the quality and accuracy of the iris code are the precision with which the perimeters 104-1 and 104-2 have been determined. Thus, if in order to speed up the detection step 12, only a limited number of classifier scales (sizes) have been used and applied at only a limited number of image locations, the detected eye region 100 (or face region) might not correspond closely with the actual region within the image and this may not enable eye modelling to precisely locate the cardinal points 103, and so affect the accuracy of the perimeters 104-1 and 104-2. Also, if a more relaxed classifier is used, again to speed up the detection step 12, it is possible that a false location may be chosen for the region 100. Also, if an acquired image is not well focused, the perimeters 104-1, 104-2 might not correspond closely with the boundaries of the iris segment—or indeed the iris pattern within the iris segment might not be easily resolved.

Alternatively, characteristics of the iris segment itself can be used to provide the confidence level directly and even without or before attempting to extract an iris code. So for example, the size of the iris segment could be used as a factor in determining confidence level—if this is large (in pixel area or diameter), then the chances of extracting a valid iris code are larger than for a smaller iris segment. If image contrast within the iris segment is high, then again the chances of extracting a valid iris code are larger than for a lower contrast iris segment.

In any case, in the present embodiment, the confidence level provides an indication of quality of iris code extracted or extractable from within the segmented iris.

If the confidence level exceeds a threshold, at step 16, either the iris code extracted from the segmented iris resulting from the first iris segmentation is selected or the segmented iris can be used to extracted the iris code according to whether a confidence level based on the iris segment or iris code has been employed in step 15, and the method stops.

As will be seen from the description above, confidence level can be based on a number of aspects of the iris segment and/or iris code and so the test at step 15 need not be a simple scalar comparison and indeed a plurality of criteria can be employed to determine whether an iris code for the iris segment identified at step 14 is to be used for the acquired image.

In practice, this aspect of the method 10 potentially speeds up iris recognition by first attempting eye modelling (step 13), directly on the result of eye, face or even body detection (step 12), i.e. features within the acquired image 150 that are larger and faster to detect than irises.

If first iris segmentation based on is detection is determined to have failed, because the confidence score is below the first threshold, this may have resulted from a poor eye modelling at step 13 and/or a low quality detection at step 12.

In this case, the method 10 proceeds at step 17, by performing a first iris identification on the region 100 detected at step 12.

Because this iris identification step 17 operates on an eye or face or body region 100 of a known size and location, the ranges of scales and potential locations for the iris region 102 can be more limited than if iris detection were performed on an entire image without any knowledge of eye location (possibly inferred from a detected face or body). This enables a finer set of scales and locations to be employed, so more accurately locating the iris region 102, but still this iris identification step can be performed much faster than doing so directly on an entire acquired image.

Now, a second eye modelling based on the iris region 102 detected by the first iris identification can be performed, step 18. This modelling can operate in the same manner as the eye modelling of step 13, except that, as it is based on a likely more accurately located iris region 102, the cardinal points 103 returned by this eye modelling are more likely to be more accurate than those returned by the eye modelling of step 13.

At step 19, similar to step 14, a second iris segmentation based on the cardinal points 103 resulting from the second eye modelling is performed.

Again a confidence level associated with the iris segment produced by step 19 is used to determine whether an iris code based on this iris segment can be used, step 20.

If the confidence level exceeds a threshold, at step 21, either the iris code extracted from the segmented iris resulting from the second iris segmentation is selected or the segmented iris can be used to extracted the iris code according to whether a confidence level based on the iris segment or iris code has been employed in step 20, and the method stops.

In the event that the second iris segmentation is determined to have failed; or in the event that the detection at step 12 failed without providing results, the presumption is that something was wrong with the detection performed at step 12, for example, either that no region 100 was detected or a false region 100 was detected.

If a subject image has been acquired so far away from a camera that a useful eye region cannot be imaged, then there will be little point in scanning an entire image with a small scale iris classifier, as it will be appreciated that this might need to be applied at a large number of locations by comparison to the number of locations used to detect the region 100 or to detect an iris region within the region 100.

On the other hand, as illustrated in FIG. 3, if the subject image has been acquired so closely that an eye (or face or body) region could not be detected at step 12, the method continues by attempting to detect an iris directly within the image.

Thus, in the event that the second iris segmentation is determined to be failed at step 20 or in the event that the detection at step 12 failed, the method 10 proceeds by performing a second iris identification on the whole image, step 22, rather than only on a detected image portion as for the first iris identification performed at step 17. In this case, iris identification is based on the assumption that the iris to be detected is large (recall that the iris scales for the identification of an iris region with the region 100 in step 17 were smaller than the detected region 100). Thus only a limited number of window locations at a limited number of scales need to be checked within the image and so even if second iris identification step 22 is required, this does not increase the processing requirement for an image greatly.

Assuming an iris region 102 is identified in step 22, a third eye modelling based on the iris region 102 detected by the second iris identification is performed. This third eye modelling can be the same as performed in steps 13 and 18. Third iris segmentation based on the cardinal points 103 resulting from the third eye modelling can then be performed, step 24, again similarly to the segmentation of steps 14 and 19.

The method 10 further proceeds by determining whether the third iris segmentation has successfully executed.

Again a confidence level associated with the iris segment produced by step 24 is used to determine whether an iris code based on this iris segment can be used, step 25.

If the confidence level exceeds a threshold, at step 26, either the iris code extracted from the segmented iris resulting from the third iris segmentation is selected or the segmented iris can be used to extracted the iris code according to whether a confidence level based on the iris segment or iris code has been employed in step 25, and the method stops.

In the event that the third iris segmentation is determined to have failed, the method can either assume that there must have been an iris within the image; or that the image does not actually contain a usable iris. For the former, at step 29, the iris segment from whichever of the first, second or third iris segmentation produced the highest confidence level can be chosen as the segment from which an iris code for the image will be extracted.

This can be for example the case where the method 10 is performed, for testing, training or recognition purposes, on a set of images which are known to contain each at least one detectable iris, i.e. ISO images or images acquired closed to the subject.

In absence of the above assumption on the image, the method 10 can instead proceed by returning an indication that no iris was detectable within the acquired image, step 28.

This could occur either because no iris is effectively present into the image 150 or it is too small to be detected (as in the case that the image is acquired very far from the subject).

The above disclosed method 10 can be carried out through the execution, by a generic software processing unit, of software instructions stored on a computer readable medium of a computer program product.

For example, the instructions can be stored into and executed by image processing means of an image processing system, wherein the images to be processed can be acquired through an image sensor of the system.

Alternatively, the method can be executed in a dedicated hardware module of an image processing device as part of or in conjunction with a biometric authentication device.

The invention claimed is:

1. A method of iris recognition, comprising:
a) acquiring an image;
b) detecting a body region larger than and comprising at least one iris in said image;
c) responsive to detecting said body region, performing a first eye modelling on the detected body region;
d) performing a first iris segmentation on the result of said first eye modelling;
e) responsive to the result of the first iris segmentation satisfying one or more first criteria, selecting the result of the first iris segmentation;
otherwise:
f) performing a first iris identification on the detected body region of said image;
g) performing a second eye modelling on the result of said first iris identification;
h) performing a second iris segmentation on the result of said second eye modelling;
i) responsive to the result of the second iris segmentation satisfying one or more second criteria, selecting the result of the second iris segmentation;
otherwise:
j) performing a second iris identification on said image, the second iris identification using a detection scale larger than the detection scale used by the first iris identification;
k) performing a third eye modelling on the result of said second iris identification;
l) performing a third iris segmentation on the result of said third eye modelling;
m) responsive to the result of the third iris segmentation satisfying one or more third criteria, selecting the result of the third iris segmentation; and
n) extracting an iris code from any selected iris segment of said image.

2. The method of claim 1, further comprising, responsive to a failure to detect a body region in said image, performing said steps j) to n).

3. The method of claim 1, wherein the first iris identification is applied at more closely spaced image locations than the second iris identification.

4. The method of claim 1, wherein the first, second and third eye modelling are the same.

5. The method of claim 1, wherein said first, second and third criteria are the same.

6. The method of claim 1, wherein:
determining whether the result of the first iris segmentation satisfies the one or more first criteria comprises determining whether a segmentation confidence score associated to said result is above a first threshold;
determining whether the results of the second iris segmentation satisfies the one or more second criteria comprises determining whether a segmentation confidence score associated to said result is above a second threshold; and
determining whether the results of the third iris segmentation satisfies the one or more criteria comprises determining whether a segmentation confidence score associated to said result is above a third threshold.

7. The method of claim 1, wherein if the result of the third iris segmentation does not satisfy the third one or more criteria, selecting the first, second or third iris segmentations providing the best results.

8. The method of claim 1, wherein if the result of the third iris segmentation does not satisfy the third one or more criteria, indicating that no iris is detectable within the image.

9. The method of claim 1, wherein detecting a body region in said image comprises performing a face detection.

10. The method of claim 1, wherein detecting a body region in said image comprises performing an eye detection.

11. An image processing system for iris recognition comprising:
an image sensor for acquiring images; and
an image processing unit arranged to:
a) detect a body region larger than and comprising at least one iris in an image acquired by the image sensor;
b) responsive to detecting said body region, perform a first eye modelling on the detected body region;
d) perform a first iris segmentation on the result of said first eye modelling;
e) responsive to the result of the first iris segmentation satisfying one or more first criteria, select the result of the first iris segmentation;
otherwise:
f) perform a first iris identification on the detected body region of said image;
g) perform a second eye modelling on the result of said first iris identification;
h) perform a second iris segmentation on the result of said second eye modelling;
i) responsive to the result of the second iris segmentation satisfying one or more second criteria, select the result of the second iris segmentation;
otherwise:
j) perform a second iris identification on said image, the second iris identification using a detection scale larger than the detection scale used by the first iris identification;
k) perform a third eye modelling on the result of said second iris identification;
l) perform a third iris segmentation on the result of said third eye modelling;
m) responsive to the result of the third iris segmentation satisfying one or more third criteria, select the result of the third iris segmentation; and
n) extract an iris code from any selected iris segment of said image.

12. A non-transistory computer program product comprising a computer readable medium on which instructions are stored which, when executed by a processing unit of an image processing system comprising an image sensor for acquiring images, are configured to cause the processing unit to:
a) detect a body region larger than and comprising at least one iris in an image acquired by the image sensor;
b) responsive to detecting said body region, perform a first eye modelling on the detected body region;
d) perform a first iris segmentation on the result of said first eye modelling;
e) responsive to the result of the first iris segmentation satisfying one or more first criteria, select the result of the first iris segmentation;
otherwise:
f) perform a first iris identification on the detected body region of said image;
g) perform a second eye modelling on the result of said first iris identification;
h) perform a second iris segmentation on the result of said second eye modelling;
i) responsive to the result of the second iris segmentation satisfying one or more second criteria, select the result of the second iris segmentation;
otherwise:
j) perform a second iris identification on said image, the second iris identification using a detection scale larger than the detection scale used by the first iris identification;
k) perform a third eye modelling on the result of said second iris identification;
l) perform a third iris segmentation on the result of said third eye modelling;
m) responsive to the result of the third iris segmentation satisfying one or more third criteria, select the result of the third iris segmentation; and
n) extract an iris code from any selected iris segment of said image.

* * * * *